US012429066B1

(12) United States Patent
Zheng

(10) Patent No.: US 12,429,066 B1
(45) Date of Patent: Sep. 30, 2025

(54) FAN LAMP WITH UNDERLYING CONTROLLER

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/904,883

(22) Filed: Oct. 2, 2024

(30) Foreign Application Priority Data

Sep. 23, 2024 (CN) ......................... 202422320457.2

(51) Int. Cl.
*F04D 29/64* (2006.01)
*F04D 25/06* (2006.01)
*F21V 19/00* (2006.01)
*F21V 33/00* (2006.01)

(52) U.S. Cl.
CPC ........... *F04D 29/646* (2013.01); *F04D 25/06* (2013.01); *F21V 19/00* (2013.01); *F21V 33/0096* (2013.01)

(58) Field of Classification Search
CPC ..... F04D 29/646; F04D 25/06; F21V 33/0096
See application file for complete search history.

(56) References Cited

U.S. PATENT DOCUMENTS 11,635,082 B1 * 4/2023 Yao ........................ F04D 25/088 416/244 R
11,892,002 B1 * 2/2024 Gajewski ................ F04D 29/38
2006/0285310 A1 * 12/2006 Shyu ...................... F04D 25/088 362/147
2008/0037264 A1 * 2/2008 Bennett ................... F21V 21/38 362/418
2019/0309761 A1 * 10/2019 Wang ..................... F04D 25/088
2023/0266000 A1 * 8/2023 Chen ...................... F04D 29/362 362/96
2024/0117819 A1 * 4/2024 Zhou ...................... F04D 29/366
2024/0230081 A1 * 7/2024 Huang .................... F21V 17/12

* cited by examiner

*Primary Examiner* — Christopher E Dunay
(74) *Attorney, Agent, or Firm* — Schwegman Lundberg & Woessner, P.A.

(57) ABSTRACT

A fan lamp with an underlying controller which includes: a motor, a fan blade, a mounting base, a controller and a lamp panel. The mounting base, the controller and the lamp panel are arranged below the motor; an mounting part is provided at a top of the lamp panel, and the controller is mounted between the mounting part and the mounting base; and the controller is electrically connected with the motor and the lamp panel, and the fan blade is arranged on a driving shaft of the motor. With the scheme of the disclosure, the controller of the disclosure is arranged below the fan, with no fan as a shield, and is closer to the ground, thus with a stronger signal and less packet loss of the remote control signal.

3 Claims, 4 Drawing Sheets

FAN LAMP WITH UNDERLYING CONTROLLER

CROSS REFERENCE TO THE RELATED APPLICATIONS

This Non-provisional application claims priority under 35 U.S.C. § 119(a) to Chinese Patent Application No. CN202422320457.2 filed on Sep. 23, 2024, the entire content of which is hereby incorporated by reference.

TECHNICAL FIELD

The disclosure relates to technical field of product design of a fan lamp, in particular to a fan lamp with an underlying controller.

BACKGROUND ART

A suspended fan lamp is an electrical appliance that combines functions of a chandelier and a ceiling fan. Besides basic functions such as lighting and ventilation, most of fan lamps have a decorative function, and there are two types of fan lamps, namely, a traditional straight-blade fan lamp and a blade-hidden fan lamp, in the market; and it is used as an auxiliary appliance of an air conditioner to improve efficiency of the air conditioner. The fan lamp is beautiful in appearance, equipped with different colors and styles of fan blades and lighting, and has functional attributes such as lighting, cooling and decoration.

Popularity of blade-visible fan lamps and fan lamps with a DC motor in the market is increasingly higher. The DC motor is generally with control to drive a fan, and most of controllers are placed in a ceiling, which are difficult for customers to install and with a poor remote control signal, and factories can't do all tests for controllers of products and the motor. Moreover, there are many components in the products, which makes it difficult to assemble.

For example, an existing fan lamp is usually of a structure including a fan mechanism, a suspension mechanism and a lighting mechanism, in which a control component is of an obvious top-mounted structure, which is difficult to install, with a poor remote control signal and difficult tests in the factory.

SUMMARY

Technical problem: an object of this disclosure is to solve problems that an existing suspended fan lamp mostly adopts a structure with a top-mounted controller, which makes actual installation difficult and a signal become worse due to shielding of a fan after installation.

Technical scheme: the disclosure adopts following technical schemes.

A fan lamp with an underlying controller includes a motor, a fan blade, a mounting base, a controller and a lamp panel.

The mounting base, the controller and the lamp panel are arranged below the motor.

A mounting part is provided at a top of the lamp panel, and the controller is mounted between the mounting part and the mounting base.

The controller is electrically connected with the motor and the lamp panel, and the fan blade is arranged on a driving shaft of the motor.

As can be seen from a position relationship, the controller is arranged below the fan and above a lamp board, which reduces interference of the fan in operation, is closer to the ground and has a higher level of signal.

Further, the controller is mounted in the mounting base, and the mounting base is connected to the mounting part.

Further, the mounting base is of a hood-shaped structure with an open bottom and which can accommodate the controller, and the mounting base with the controller accommodated is then clamped with the mounting part of the lamp panel.

A mounting mode of the controller is provided. In fact, it can be seen from the above that the mounting base is actually a bottom surface of a metal hood, that is, the controller is integrated with the bottom surface of the metal hood, and connection between the controller and the fan is more convenient, which is more convenient for the manufacturer to carry out tests. After the tests are completed, the assembled controller and the mounting base can be delivered directly as a whole, which not only removes part of work of an installer, but also reduce a space occupied by delivery in a delivery process because the mounting base has a space for accommodating the controller, and thus more goods can be delivered with a same volume, thus reducing transportation cost.

Further, the hood-shaped structure of the mounting base is provided with a first clamping part, and the mounting part on the lamp panel is provided with a second clamping part, and the first clamping part and the second clamping part are matched and clamped with each other.

Connection implementation of the mounting base and the mounting part is provided.

Further, the controller is installed within the mounting part, and the mounting part is connected to the mounting base.

Further, the mounting base is of a disk-shaped cap structure, and a cylindrical mounting part capable of accommodating the controller is provided on the lamp panel, and the mounting part with the controller accommodated is connected with the mounting base.

This is another way to mount the controller, which indicates that the mounting base is split into two parts, one of which is integrated into the lamp panel and the other of which still serves as the bottom surface of the metal hood, so that the bottom surface is used for the fan and the fan can be integrated, and the lamp panel also has a space to accommodate the controller. However, because the controller and the fan are separated, its test aspect is not superior to the previous method, and thus it is prefer to adopt the hood-shaped mounting base.

Further, an outer edge of a cap of the mounting base is provided with a first clamping part, and the mounting part of the lamp panel is provided with a second clamping part, and the first clamping part and the second clamping part are matched and clamped with each other.

Further, a metal hood with an open bottom is provided outside the motor, and a plurality of evenly distributed groove holes for the blade connected to the driving shaft of the motor to pass through are provided on a circumferential side wall of the metal hood. A center of an upper surface of the metal hood is opened to accommodate the driving shaft of the motor. An upper surface of a housing of the motor is fixed to an inner surface of an upper side of the metal hood. The upper surface of the metal hood is connected with a hollow fixing ring. A shade with an opening corresponding to a hollow position of the fixing ring is sleeved outside the fixing ring. The opening of the shade is connected with a hanger rod through a collar. The bottom of the metal hood is provided with a positioning hole for positioning the driving shaft of the motor, and the positioning hole is arranged at the center of the upper surface of the mounting base.

A specific connection mode between the motor and the mounting base is provided.

Beneficial effects: Compared with the related art, the disclosure has following advantages.

1. The controller of the disclosure is arranged below the fan, with no fan as a shield, and is closer to the ground, thus with a stronger signal and less packet loss of the remote control signal.
2. With design that the controller of the disclosure can be accommodated in the mounting base or the lamp panel in advance, pre-integration of mounting can be realized, a number of parts when the product is delivered is reduced, and assembly of a whole machine in the factory is more convenient.
3. As the space for placing the controller in advance is provided, delivery after installation reduces work of the installer and prevents misoperation of the installer.
4. The mounting base with a hood-shaped structure more facilitates test operations in the factory.

DETAILED DESCRIPTION

Figure 1:
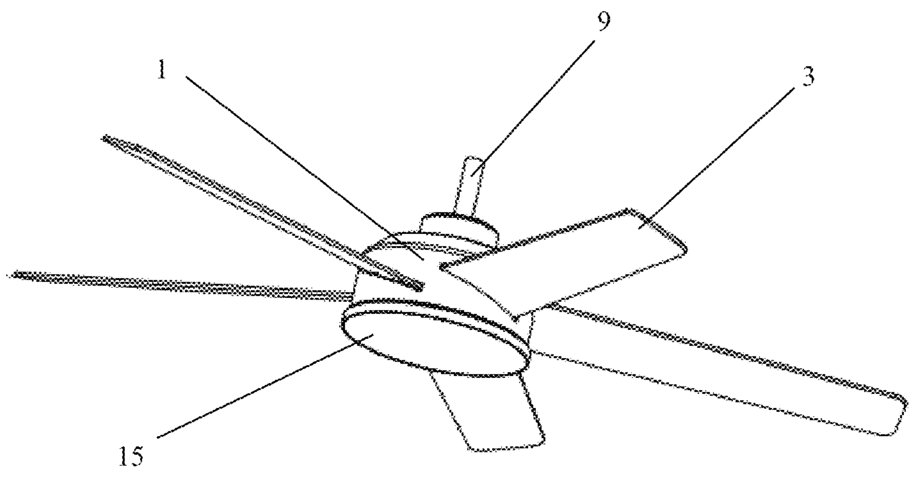
FIG. 1 is a schematic structural view of the disclosure.
Figure 2:
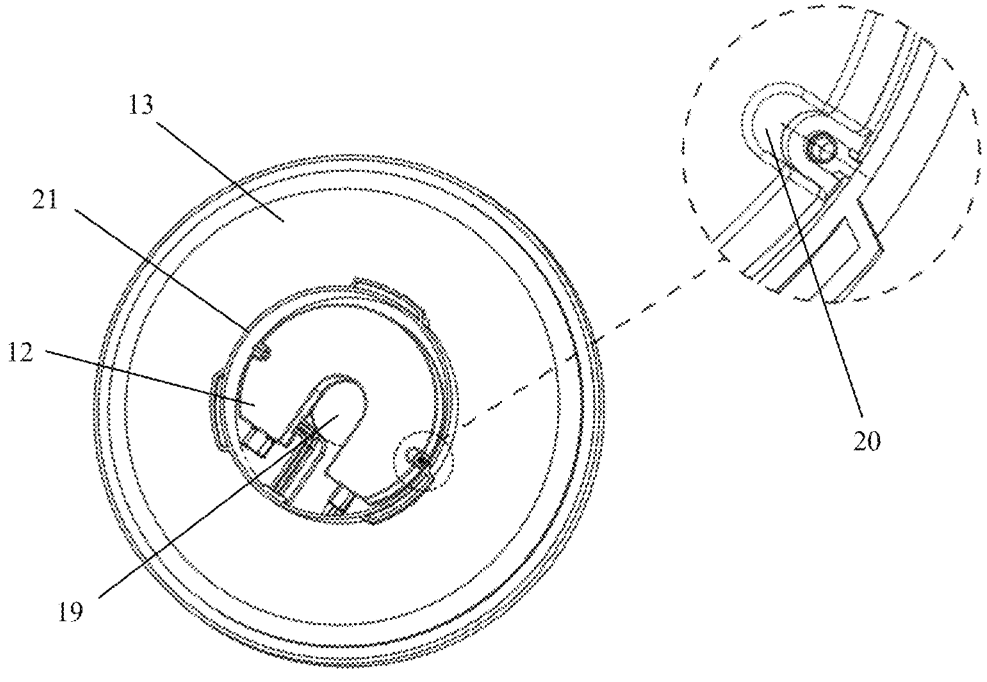
FIG. 2 is a schematic view of a through hole of a lamp panel of the disclosure.
Figure 3:
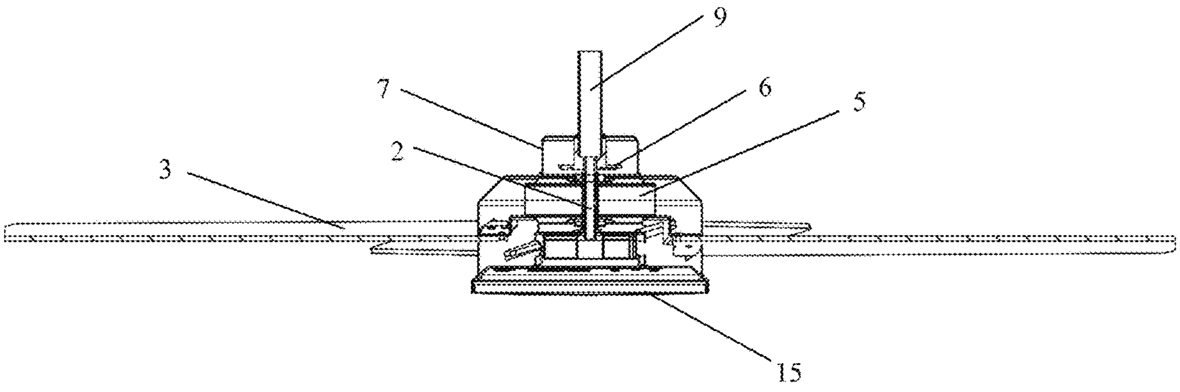
FIG. 3 is a sectional view of the disclosure after assembly.
Figure 4:
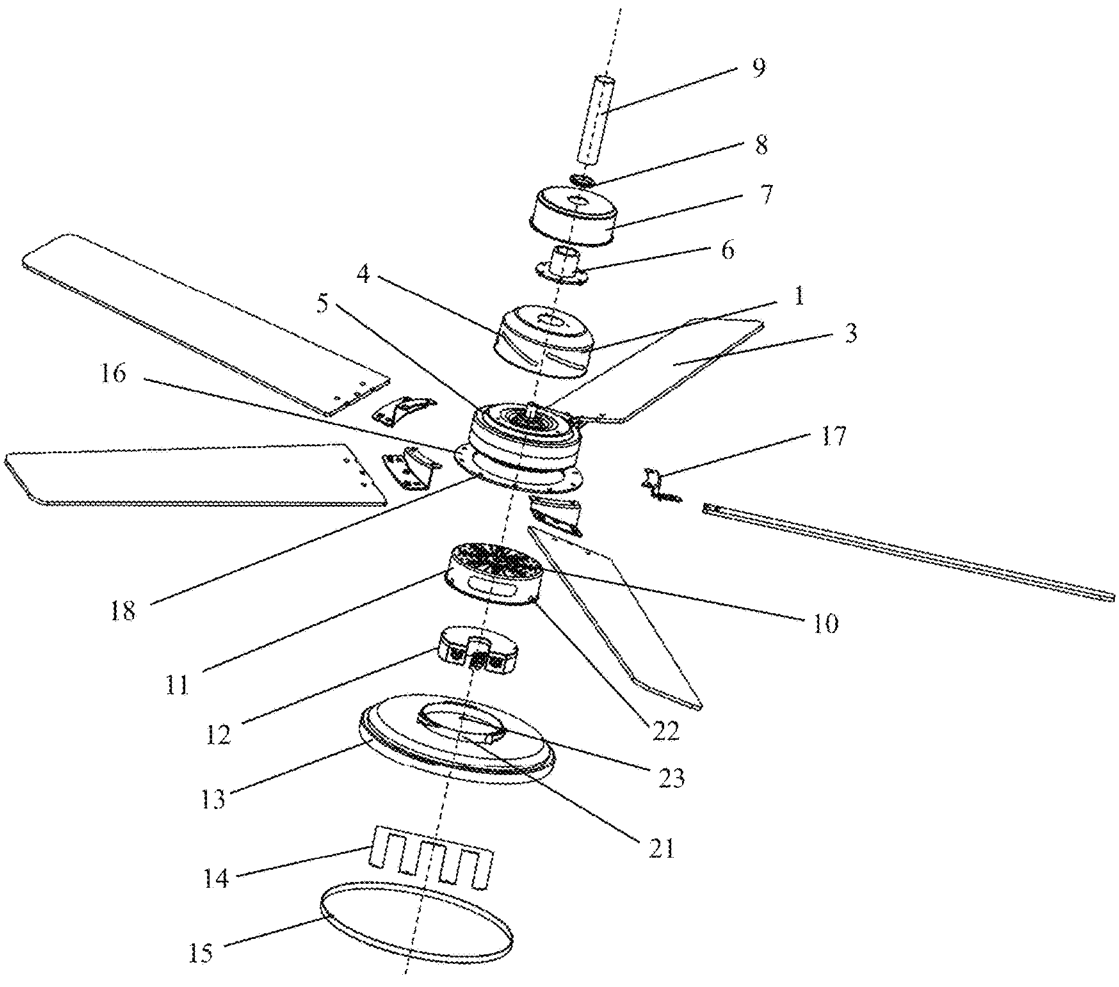
FIG. 4 is a schematic exploded view of the disclosure adopting a mounting base with a hood-shaped structure.

The disclosure will be further explained in the following according to drawings and embodiments.

Embodiment 1

As shown in FIG. 1 to FIG. 4, a fan lamp with an underlying controller includes a motor (not shown), a metal hood 1 with an open bottom is provided outside the motor, and a plurality of evenly distributed groove holes 4 for the blade 3 connected to the driving shaft 2 of the motor to pass through are arranged on a circumferential side wall of the metal hood 1. A center of an upper surface of the metal hood 1 is opened to accommodate the driving shaft 2 of the motor. An upper surface of a housing 5 of the motor is fixed to an inner surface of an upper side of the metal hood 1. The upper surface of the metal hood 1 is connected with a hollow fixing ring 6. A shade 7 with an opening corresponding to a hollow position of the fixing ring 6 is sleeved outside the fixing ring 6. The opening of the shade 7 is connected with a hanger 9 rod through a collar 8. The bottom of the metal hood 1 is provided with a positioning hole 10 for positioning the driving shaft 2 of the motor, and the positioning hole 10 is arranged at the center of the upper surface of the mounting base 11, and a controller 12, a lamp panel 13, a lamp board 14 and a lampshade 15 are sequentially arranged below the mounting base 11.

The lampshade 15 is made of a transparent material, which is common knowledge in this art, generally made of PC plastic.

The drive shaft 2 of the motor is a hollow drive shaft, and a lower end of the hollow drive shaft is connected with an annular disc 16, and a plurality of fixing holes 18 for fixedly connecting with one end of a blade arm 17 are evenly distributed in a circumferential direction of the annular disc 16.

The mounting base 11 is of a hood-shaped structure with an open bottom and a space capable of completely accommodating the controller 12 in a height direction, and the mounting base 11 with the controller 12 accommodated is then clamped with a second clamping part 23 near a center of the lamp panel 13.

The other end of the blade arm 17 is connected with the blade 3, the end of the blade arm 17 connected with the annular disk 16 is horizontally arranged, and the end of the blade arm connected with the blade 3 is obliquely arranged.

A power line (not shown) of the controller 12 passes through the motor from the hollow drive shaft 2 of the motor, and then is connected to a power supply (not shown) located above the motor.

A through hole 19 for an output line of the controller 12 to pass through is reserved on the mounting base 11.

The output line of the controller 12 passes through the hollow drive shaft 2 of the motor and then is connected with a signal input line (not shown) on the housing 5 of the motor.

The output line of the controller 12 passes through the through hole 19 and then is connected to the lamp board 14.

The controller 12 is an 89C51 single chip microcomputer.

In the space where the controller 12 can be accommodated, a limit block or a limit nail can be provided to prevent the controller from sliding, and then a limit groove 20 matched with the limit block is provided on the controller to realize locking and limiting so as to prevent the controller from sliding.

The hood-shaped structure of the mounting base 11 is provided with a first clamping part 22, and the mounting part 21 on the lamp panel 13 is provided with a second clamping part 23, and the first clamping part 22 and the second clamping part 23 are matched and clamped with each other.

Embodiment 2

Figure 5:
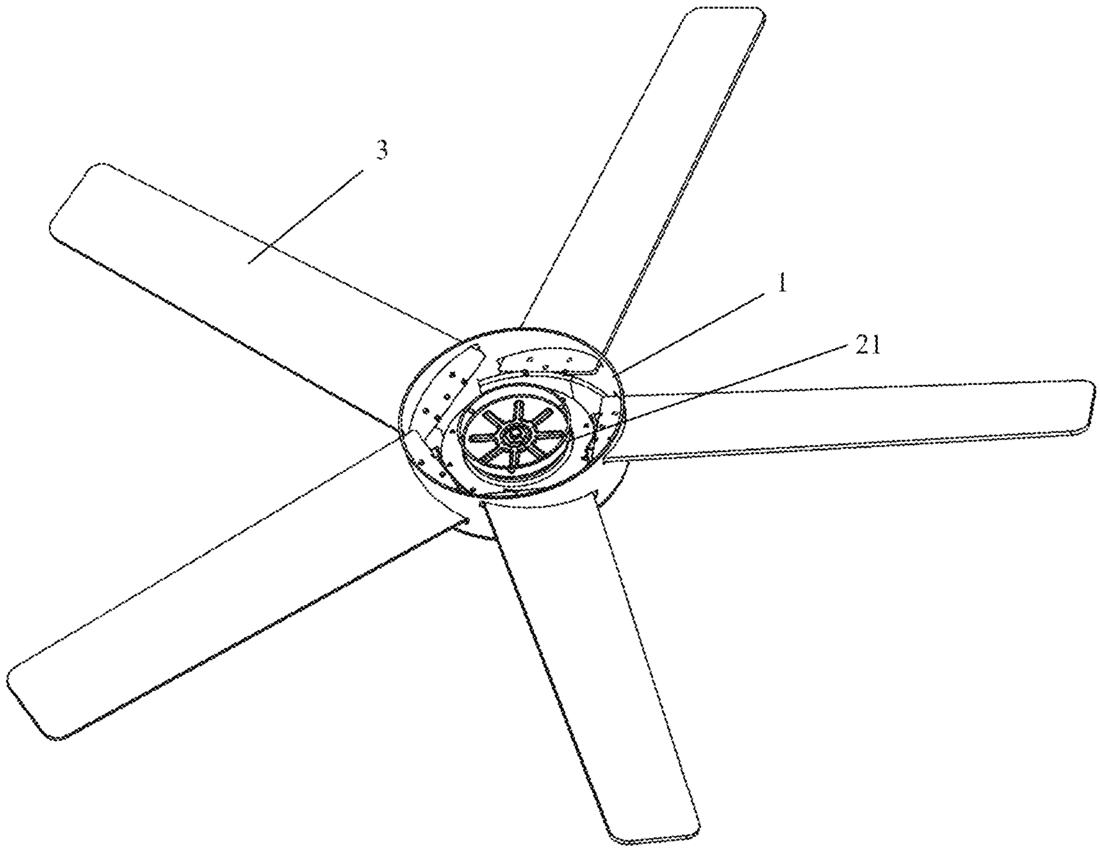
FIG. 5 is a schematic view of a mounting base of the disclosure where the motor has not been mounted.
Figure 6:
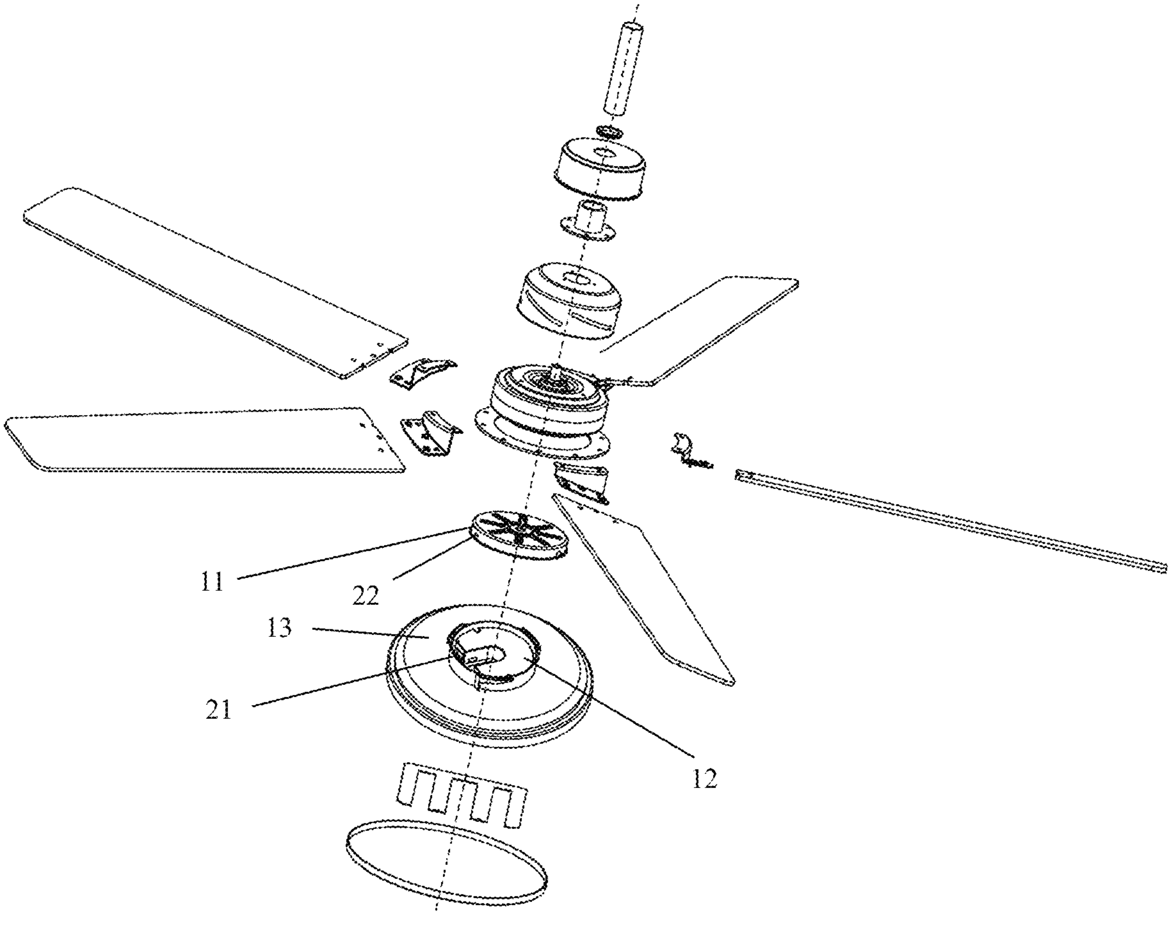
FIG. 6 is a schematic exploded view of the disclosure adopting a mounting base with a disk-shaped cap structure.

As shown in FIG. 5 and FIG. 6, on a basis of Embodiment 1, the mounting base 11 is modified into a disk-shaped cap structure, and a mounting part 21 capable of completely accommodating the controller is formed on an upper surface of the lamp panel 13 near its center, and an opening of the mounting part 21 with the controller 12 accommodated is connected with the mounting base 11.

Further, an outer edge of a cap of the mounting base 11 is provided with a first clamping part 22, and the mounting part 21 of the lamp panel 13 is provided with a second clamping part (not shown), and the first clamping part and the second clamping part are matched and clamped with each other.

What is claimed is:

1. A fan lamp with an underlying controller, comprising:

a motor, a fan blade, a mounting base, a controller and a lamp panel, wherein the mounting base, the controller and the lamp panel are arranged below the motor;

an mounting part is provided at a top of the lamp panel, and the controller is mounted between the mounting part and the mounting base; and the controller is electrically connected with the motor and the lamp panel, and the fan blade is arranged on a driving shaft of the motor;

wherein the controller is mounted in the mounting base, and the mounting base is connected to the mounting part;

wherein the mounting base is of a hood-shaped structure with an open bottom and which is capable of accommodating the controller, and the mounting base accommodating the controller is then clamped with the mounting part of the lamp panel;

wherein a metal hood with an open bottom is provided outside the motor, the mounting base is a bottom surface of the metal hood, the controller is integrated with the bottom surface of the metal hood, and the controller is connected with a fan;

wherein the controller is arranged below the fan and above a lamp board, which reduces interference of the fan in operation.

2. The fan lamp with the underlying controller according to claim 1, wherein the hood-shaped structure of the mounting base is provided with a first clamping part, and the mounting part on the lamp panel is provided with a second clamping part, and the first clamping part and the second clamping part are matched and clamped with each other.

3. The fan lamp with the underlying controller according to claim 1, wherein a plurality of evenly distributed groove holes for the blade connected to the driving shaft of the motor to pass through are provided on a circumferential side wall of the metal hood, a center of an upper surface of the metal hood is opened to accommodate the driving shaft of the motor, an upper surface of a housing of the motor is fixed to an inner surface of an upper side of the metal hood, the upper surface of the metal hood is connected with a hollow fixing ring, a shade with an opening corresponding to a hollow position of the fixing ring is sleeved outside the fixing ring, the opening of the shade is connected with a hanger rod through a collar, the bottom of the metal hood is provided with a positioning hole for positioning the driving shaft of the motor, and the positioning hole is arranged at the center of the upper surface of the mounting base.

* * * * *